July 23, 1946.   J. W. LISKA   2,404,578
MULTIPLE CHAMBER FLUID CONTAINER
Filed July 26, 1940   2 Sheets-Sheet 1
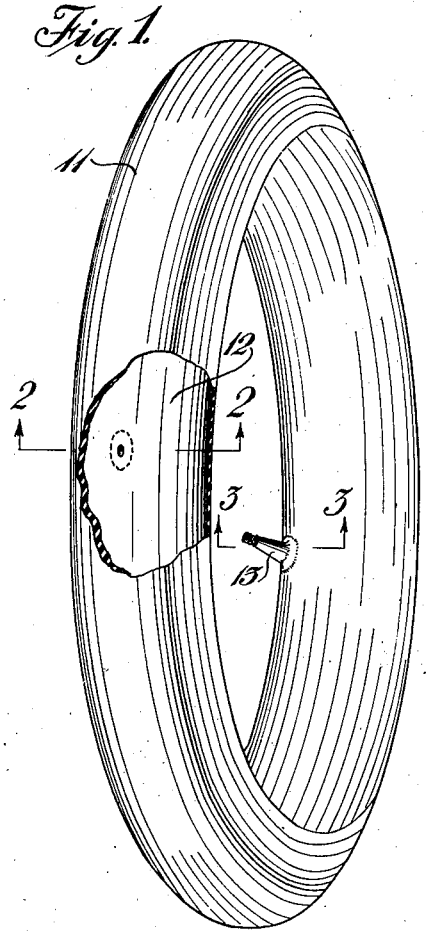
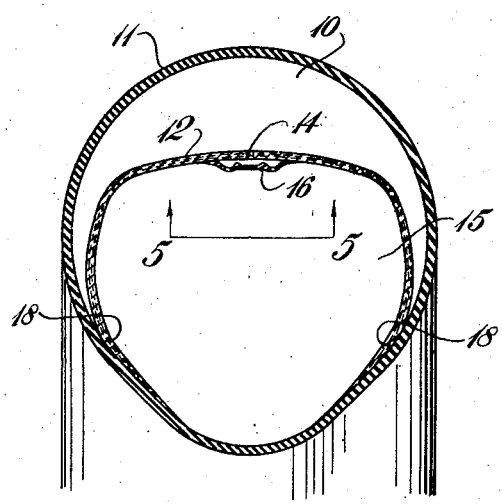
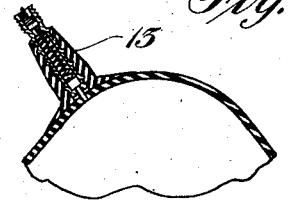
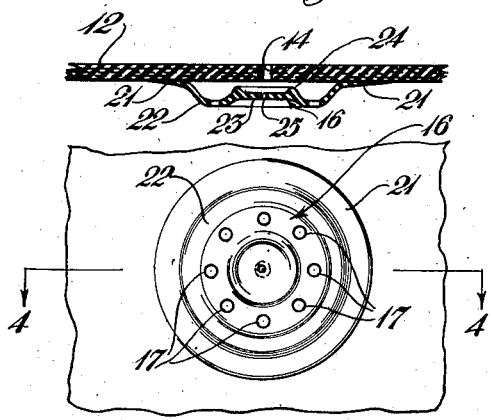
INVENTOR
John W. Liska
BY Ely & Frye
ATTORNEYS July 23, 1946.   J. W. LISKA   2,404,578
MULTIPLE CHAMBER FLUID CONTAINER
Filed July 26, 1940    2 Sheets-Sheet 2

INVENTOR
John W. Liska
BY
ATTORNEYS

Patented July 23, 1946

2,404,578

UNITED STATES PATENT OFFICE 2,404,578

MULTIPLE CHAMBER FLUID CONTAINER

John W. Liska, Akron, Ohio, assignor to The Firestone Tire & Rubber Company, Akron, Ohio, a corporation of Ohio Application July 26, 1940, Serial No. 347,713

8 Claims. (Cl. 152—342)

This invention relates to fluid retaining containers for pneumatic tires and more particularly to multiple chamber safety inner tubes.

Heretofore, double chamber inner tubes have been known in which there are two concentric chambers, with means for introducing pressure fluid into one of the chambers and a very small passage between the two chambers to permit the pressure fluid to flow from one chamber into the other and permit equalization of pressure between the chambers during operation. However, in these previous devices the relative size of this passage between the chambers has been deliberately kept small because it was thought necessary in order to retain its safety characteristics. In the event of a blowout or rupture in the outer chamber, a large passage would permit the air to rush out so fast from the inner chamber that the highly desirable safety characteristics would be substantially nullified. A great disadvantage of such a very small passage is that considerable time is necessary to effect inflation. Also with a very small passage it is practically impossible to get enough of the pressure fluid out of the inner chamber to permit demounting of the tire because as the pressure in the chamber continues to decrease, its rate of flow through the small passage progressively becomes less and less. Another disadvantage is that unless the effective cross sectional area of the passage is at least as great as the effective cross sectional area of the primary inflating valve for inflating the tube from the external source, a pressure differential will develop between the two chambers and an inaccurate indication of the pressure in one of the chambers will result.

Accordingly, a major object of the invention is to overcome the above disadvantages.

More specifically, the objects are to provide a double chamber safety tube, with means for normally permitting rapid inflation and deflation of both chambers of the tube while controlling the flow of fluid from the inner to the outer chamber in the event of a blowout or rupture in the outer chamber; to provide such a double chamber safety tube with a passage or passages between the two chambers of total effective cross sectional area, at least as great, but preferably slightly greater, than the effective area of the passage of the primary inflating means, together with valve means associated with such passage or passages responsive to a pressure differential to control or reduce the effective cross sectional area of the passages between the chambers; to provide an improved valve means in a safety tube of the character mentioned, between the two chambers which will be responsive to a pressure differential to control the flow of fluid from the inner to the outer chamber in the event of a blowout or rupture in the outer chamber; to provide such an improved valve means which will be positive in its action, will be inexpensive to manufacture and will be of such shape as to facilitate its incorporation in a safety tube of the character above mentioned.

Other and further objects will be readily apparent from the following description, considered in connection with the accompanying drawings, in which:

Figure 1 is a perspective view of an inner tube embodying the invention, a part thereof being broken away to show the underlying structure;

Figure 2 is a section, on a larger scale, on the line 2—2 of Figure 1.

Figure 3 is a section, on the same scale as Figure 2, on the line 3—3 of Figure 1, to illustrate the relative size of the cross sectional areas of the primary inflation means and the passage between the two chambers.

Figure 4 is an enlarged section of the valve means between the chambers, shown in Figures 2 and 5, looking in the direction indicated by the arrows 4—4 of Figure 6;

Figure 5 is a plan view of the valve means shown in Figures 2 and 4, looking in the direction indicated by the arrows 5—5 in Figure 2;

Figure 7:
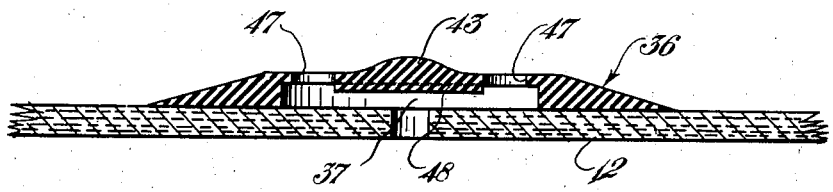
Figure 7 is a vertical section, on the line 7—7 of Figure 8, of a further modified form of the valve.

An embodiment of the present invention is illustrated by the fundamental elements of the combination; an annular tubular body 11 of elastic rubber composition or composition having similar characteristics, forming an outer chamber 10; a concentric wall 12 which serves as part of a wall of an inner chamber 15 inside of the outer chamber; a primary inflation valve 13 by which pressure fluid from an external source may be introduced into the inner chamber 15; and a passage 14 in the wall 12 with which there is associated a valve 16 to control the flow of pressure fluid from the inner to the outer chamber in the event of a blow out or rupture in the wall of the outer chamber. The aperture or passage 14 is at least as large, and preferably larger than, the area of the primary inflation valve 13 and is normally open and unaffected by any flow of pressure fluid through the valve 13 in either direction, the valve 16 being responsive to a pressure differential to be forced toward the wall 12 when there is a greater pressure in the inner chamber 15 than in the outer chamber 10, as in the event of a blow out or rupture in the outer chamber. The combined area of apertures 17 in the flexible part of the valve 16 is greater than the area of the passage 14 and these apertures have no essential bearing on the invention, they merely being present to complete the communication between the inner and outer chambers.

The present invention is adaptable to any kind of a multiple chamber tube and is not limited to the particular type of tube shown for purposes of illustration. In the illustration shown, the wall 12 is made of substantially inelastic rubberized fabric similar to the conventional tire casing plies in which the reenforcing elements or cords are arranged at an angle to the axis of the tube and is joined by vulcanization to the outer tubular body 11 adjacent the respective bead regions of the tube, indicated at 18, 18. However, as far as the basic aspect of this invention is concerned, it is not necessary to have the margins of the wall 12 joined to the tubular body 11. It is only necessary that the wall 12 be arranged inside of the tubular body 11 and serve as a part of a common wall between the outer chamber and a chamber disposed radially inwardly of the tread part of the outer wall 11. In a safety tube of this type, the inner wall 12 is merely adapted to be disposed in a position to protect it from the impacts and possible punctures to which the tread part of the tire is subjected and is adapted to retain a certain portion of the original fluid pressure, and to serve as a "boot" or reenforcement for a rupture in the tire casing when the latter ruptures.

The valve 16, as shown, is in the form of a circular rubber disc and has a peripheral flange 21 which is integrally bonded by vulcanization to the inner face of the wall 12 and is preferably disposed substantially concentric to the passage 14, but in any event is disposed so that the passage 14 is within the region where the flange 21 is joined to the wall 12. The valve 16 is generally dome-shaped and has an annular concavo-convex region 22 disposed inwardly of the flange 21, in which region a plurality of apertures 17 are located. This concavo-convex region is readily flexible to enable operation of the valve 16 without subjecting any part thereof to tensile strains. Axially of the concavo-convex region 22, a planar disc portion 23 is integrally formed and has an annular rib 24 on one side thereof, which serves as the sealing element of the valve. The rib 24 is adapted to contact the wall 12 to control the flow of fluid pressure through the passage 14, so that it is necessary that the valve 16 be so disposed on the wall 12 that this rib 24 completely surrounds the passage 14 in order for the valve to function most efficiently. The disc portion 23, while of flexible rubber, is of sufficient stiffness to prevent it from being forced through the passage 14, and is provided with an axial bleeder orifice 25 which provides a predetermined minimum passage between the two chambers when the valve 16 closes against the wall 12. It will be readily apparent that since the valve 16 is arranged on the inner face of the wall 12, any appreciably greater pressure in the inner chamber 15 than in the outer chamber 10 will force the central part of the valve 16 outwardly toward the wall 12 until the annular rib 24 contacts the latter and closes communication between the inner chamber and the outer chamber except for the small orifice 25. The orifice 25 is desirable to insure equalization of pressure between the two chambers and to permit the slow escape of fluid pressure from the inner chamber in the event of a rupture in the outer chamber for the purpose of discouraging the driver from continuing to drive on the inner chamber. It will be readily apparent that any mechanical equivalent of the orifice 25 can be used without departing from the spirit of the invention. For example, instead of the orifice, a recess may be provided in the annular rib 24 or a projection may be provided, either on the rib or on the surface of the wall 12 to prevent the valve 16 from completely closing the passage between the two chambers.

The passage 14 in the wall 12 has an effective cross sectional area which is preferably slightly greater than the cross sectional area of the primary inflating valve 13. In considering the effective cross section, the pressures to which these valves are subjected are taken into consideration. For instance, if the physical area of the valve 13 and the valve 16 were exactly the same, the effective cross sectional area of the valve 13, for all practical purposes, would be greater than that of the valve 16, because the inflating valve 13 will be subjected to the total pressure of the source of inflating fluid. If the areas are equal and the valve 13 is connected to an external source of high fluid pressure, a pressure differential will develop between the inner and outer chambers. It is definitely an object of this invention to avoid this. For this reason, the cross sectional area of the passage 14 is enough larger than the area of the valve 13 to insure that no substantial pressure differential between the two chambers will develop when the tube is being inflated from the external source.

The improved inner tube is mounted in a pneumatic tire casing in the usual manner. During inflation of the tube, air passes first into the inner chamber 15 and then through the apertures 17 in the valve 16 and the passage 14 in the wall 12 into the outer chamber 10, the valve 16 remaining open because of the substantially equal fluid pressure on both sides of the wall 12. The arrangement enables the two chambers of the tube concurrently to be inflated without any substantial pressure differential developing between the two chambers. There is no waste of time such as occurs when the air is required to pass through very small apertures between the two chambers and inflation through the primary inflating valve 13 requires no longer time than that required for inflating a single chamber tube. Moreover, there is no possibility of an inaccurate indication of the fluid pressure in either of the two chambers. The pressure indicated at the valve 13 will always be a correct indication of the fluid pressure in both chambers.

When the tire and tube are in inflated condition and a blowout or rupture occurs, the outer chamber 10 of the tube is rapidly deflated and causes a pressure differential between the chambers 10 and 15. This pressure differential causes the central portion 23 of the valve 16 to be forced toward the wall 12 so that the annular rib 24 will contact the inside of the wall 12 and thereby greatly reduce the rate of flow of the pressure fluid from the inner to the outer chamber. As explained above, however, the valve is designed with a by-pass 25 to permit the pressure from the inner chamber to gradually escape therefrom. The time required for complete deflation of the inner chamber may be from approximately one to six minutes. It should be long enough to enable the driver of the vehicle to bring the latter under control, or to a stop, but not long enough to encourage him to drive on the partly deflated tube, since this would eventually result in serious damage to the tire and tube.

Figure 8:
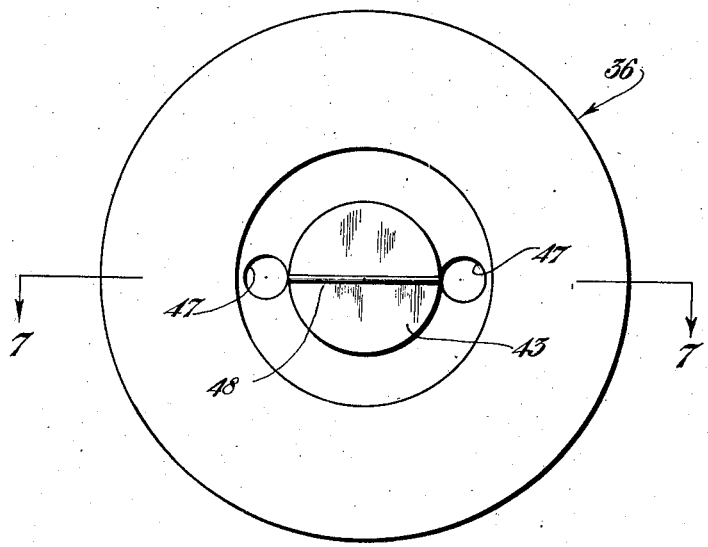
Figure 8 is a plan view of Figure 7.
Figure 6:
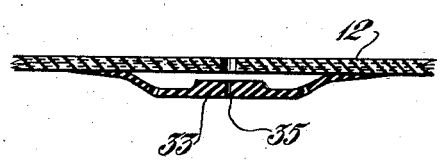
Figure 6 is a modified form of the embodiment shown in Figures 4 and 5.

The valve between the two chambers may take varied forms, as shown by modifications of Figures 6, 7, and 8.

In Figure 6 the valve 26 is shown with a thickened central region 33 having an aperture 35 therein. The undersurface of the central region 33 is planar. Otherwise this modification is similar to that of Figure 4.

Figures 7 and 8 show a further modified form in which the valve 36 comprises an annular disc similar to that of the previous figures, but having a recess 37 which spaces the central region 43 from the dividing wall 12 between the inner and outer chambers when the outer edge of the disc is attached to the wall. By reason of the recess the outer area of the central region will be flexible to facilitate operation of the valve against the wall 12. The valve has a thickened portion 44 which serves as the valve element and it is preferably of sufficient thickness to prevent it from being pushed into the aperture 14 in the wall, in the event of high pressure differential when the outer chamber blows out or ruptures. This thickened portion could serve as a weighted valve element to close in response to centrifugal force when the wheel operates above a predetermined speed. The apertures 47 are to provide communication between the chambers, since the valve 36 is placed over the aperture 14 in the wall 12. The side of the central region 43 adjacent the wall 12 is provided with a transverse rib 48 which prevents the valve 36 from tightly closing the aperture 14. It is desired to keep the valve from closing tightly in order to discourage a driver from continuing to drive the vehicle after the outer chamber has blown out or ruptured. It is to be understood that the combined area of the apertures 47 is greater than the area of the passage 14 in the wall 12. As will be readily apparent from the foregoing description, the valve 36 will be forced against the wall 12 to reduce the flow of air through the passage 14 in the event the outer chamber blows out. It is to be understood that the valves shown in Figures 7 and 8 will be attached to the underside of the wall 12 in a manner similar to the embodiments previously described.

It is to be understood that where, in the specification and claims, the singular is used, the plural is also contemplated where the cumulative effect of the plural elements is the same as that of a larger single element.

The description which has been given, recites more or less detail of the particular embodiments of the invention, which are set forth as new and useful. However, it is to be understood that the invention is not limited to exact details of construction, because it is manifest that changes and modifications may be made within the scope of the appended claims without departing from the spirit of the invention. Also, the invention is not limited to the applications or uses described, but it is to be understood as contemplating all inherent uses or functions.

What is claimed is:

1. An inner tube for pneumatic tires, said inner tube comprising an outer chamber and an inner chamber, a wall dividing said chambers, valve means operably associated with said passage responsive to pressure differential between said chambers for controlling the rate of fluid flow through said passage, said valve means comprising an annular disc having its outer edge secured to the inside of said wall in a region surrounding said passage, said valve having a central recessed portion having a surface adjacent to but spaced from said wall over said passage, the surface of said recessed portion adjacent to said wall having a projection thereon in the immediate region of said passage to prevent said central portion from completely closing said passage.

2. A valve in combination with a separating wall, having an opening therethrough comprising a valve chamber formed of flexible material attached around said opening on the inner air chamber side of said wall, said flexible material normally being maintained away from said wall at the position of said opening, vent means in said flexible material at a position adapted to contact said wall upon collapse of said flexible material, a port in said flexible material positioned to register with said opening in said separating wall upon collapse of said flexible material, the collapse of said flexible material being caused by a quick release of substantial air pressure on the other side of said wall, movement of the flexible material of the valve against the separating wall sealing the vents, the port means maintaining air communication with the opening in said separating wall at all times.

3. Means for controlling movement of air through a separating wall having an opening therethrough between air pressure chambers of a safety tube or the like comprising a substantially collapsible valve chamber over said opening on one side of said separating wall, said valve chamber having a cover portion, vent means in said cover portion for the passage of air into and from said valve chamber, flange means between the vent means and the opening preventing substantial movement of air through said vent means to said opening when said valve chamber is collapsed, a restricted port through said cover positioned to register with the opening, the cover normally remaining spaced from said separating wall, and said cover being adapted under difference in pressures such as is caused by sudden substantial failure of the air pressure on the side of said separating wall opposite to that on which said cover is located, to collapse and thus normally close the vent means against the passage of air through said vent means into the opening in the separating wall, the restricted port normally remaining open to the passage of air through the separating wall opening.

4. A valve in combination with a separating wall having an opening therethrough, comprising a collapsible valve chamber over said opening on one side of said separating wall, vent means for the passage of air to and from said collapsible valve chamber, means in said collapsible valve chamber, positioned to prevent the passage of air between said vent means and said opening upon collapse of said valve chamber, a restricted port in said valve chamber normally registering with said opening for the passage of air regardless of the collapse of said valve chamber, said valve chamber being adapted to collapse upon the sudden removal of substantial air pressure on the other side of said separating wall from said valve chamber.

5. Means for controlling movement of air through a wall of a safety tube or the like comprising a separating wall having a port therein for the interpassage of fluid therethrough, a flexible collapsible cover arranged over said port and secured to said wall on one side thereof, said cover and wall being normally spaced from one another and forming a valve chamber, a vent passage in said cover, connecting said valve chamber with the exterior of said chamber on said one side of said wall and out of register with said port, a bleed opening in said cover connecting said valve chamber with the said exterior and adapted to register with said port, said vent passage normally connecting with said port through the valve chamber to interpass fluid between said exterior on said one side of the wall, and the other side of the wall, whereby collapse of said cover and valve chamber in response to a preponderance of pressure exteriorly of said chamber on said one side of the wall over that in said valve chamber and on the other side of said wall interrupts the inter passage of fluid between the one side of said wall exteriorly of said chamber and the other side except through said bleed opening and port in registry therewith.

6. A valve for a pneumatic tire inner tube such as comprises an internal non-elastic wall dividing it into inner and outer chambers that are in communication with each other through a passage in said wall, said valve consisting of a unitary shallow, dish-shaped rubber structure comprising a peripheral flange adapted to be attached to said internal tube-wall in concentric relation to the passage therethrough with the bottom portion of said structure spaced apart therefrom, said rubber structure being collapsible under impetus of pressure differential on opposite sides thereof, a bleeder orifice through the top portion of said rubber structure, a continuous annular rib about said orifice and spaced therefrom formed inside and on the bottom portion of said rubber structure, a plurality of apertures formed through the wall of said rubber structure intermediate said rib and said flange, the total cross sectional area of said apertures being such as to permit pressure fluid to pass freely therethrough without collapsing said rubber structure in the absence of substantial pressure differential on opposite sides of said rubber structure.

7. A valve in combination with a separating wall for an inner tube of the two compartment type, said tube having an inner and outer wall, a port in the inner wall through which the tube inflation pressure in said compartments normally equalizes, a rubber valve portion secured to the inside surface of the inner wall and being disposed over said port, said valve portion having a bleeder hole aligned with said port, said hole being relatively small in relation to said port, said valve portion having its edge portions permanently attached to said inside surface and having its central portion normally spaced apart therefrom thereby forming a collapsible valve chamber, an annular rib encircling said hole and projecting into said chamber and being adapted to seat on said inner wall about said port when said chamber is in collapsed condition with said port, a plurality of apertures formed through said rubber valve portion in the area thereof outside the circle formed by said rib, said apertures having at least as great combined effective cross sectional area as the cross sectional area of said port.

8. A valve in combination with a separating wall having an opening therethrough, comprising a collapsible valve wall providing a chamber over said opening on one side of said separating wall, vent means for the passage of air to and from said valve chamber, means carried by said valve chamber wall positioned for reducing the effective cross-sectional area of said opening in said wall upon collapse of said valve chamber wall and providing a passageway for air regardless of the collapse of said chamber wall, said valve chamber wall being adapted to collapse upon sudden removal of substantial air pressure on the other side of said operating wall from said valve chamber.

JOHN W. LISKA.